United States Patent
Huang et al.

(10) Patent No.: US 11,001,525 B2
(45) Date of Patent: May 11, 2021

(54) SIZING COMPOSITION FOR WET USE CHOPPED STRAND GLASS FIBERS

(71) Applicant: Owens Corning Intellectual Capital, LLC., Toledo, OH (US)

(72) Inventors: Helen Huang, New Albany, OH (US); Mohammed Tazi, New Albany, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 78 days.

(21) Appl. No.: 16/306,598

(22) PCT Filed: Jun. 15, 2017

(86) PCT No.: PCT/US2017/037594
§ 371 (c)(1),
(2) Date: Dec. 3, 2018

(87) PCT Pub. No.: WO2017/218726
PCT Pub. Date: Dec. 21, 2017

(65) Prior Publication Data
US 2019/0161405 A1    May 30, 2019

Related U.S. Application Data

(60) Provisional application No. 62/351,618, filed on Jun. 17, 2016.

(51) Int. Cl.
*C04B 20/10* (2006.01)
*C03C 25/28* (2018.01)
(Continued)

(52) U.S. Cl.
CPC .......... *C04B 20/1033* (2013.01); *B32B 5/022* (2013.01); *B32B 5/024* (2013.01);
(Continued)

(58) Field of Classification Search
CPC ..... H05K 1/0366; D06M 15/61; D02G 3/182; C08J 5/08; Y10T 428/2962;
(Continued)

(56) References Cited

U.S. PATENT DOCUMENTS

| 4,305,742 A | 12/1981 | Barch et al. |
| 4,455,343 A | 6/1984 | Temple |

(Continued)

FOREIGN PATENT DOCUMENTS

| EP | 0208197 B1 | 5/1989 |
| EP | 0424701 A1 | 5/1991 |

(Continued)

OTHER PUBLICATIONS

International Search Report and Written Opinion from PCT/US2017/037594 dated Sep. 5, 2017.

*Primary Examiner* — Camie S Thompson
(74) *Attorney, Agent, or Firm* — Calfee, Halter & Griswold LLP (57) ABSTRACT

A sizing composition including water, a polyvinylpyrrolidone film former, a silane coupling agent, a lubricant, and a surfactant is provided. The polyvinylpyrrolidone film former constitutes from 30 wt. % to 50 wt. % of the dry solids of the sizing composition. Wet use chopped strand glass fibers for use in reinforcing gypsum board are also provided. The wet use chopped strand glass fibers include chopped glass fibers having the sizing composition applied thereto. The sizing composition improves fiber bundle integrity, fiber flow rate, fiber flow rate consistency, and dispersibility of the wet use chopped strand glass fibers in a gypsum matrix or slurry.

19 Claims, 7 Drawing Sheets

(51) Int. Cl.

| | | |
|---|---|---|
| *E04C 2/04* | (2006.01) | |
| *E04C 2/06* | (2006.01) | |
| *B32B 13/14* | (2006.01) | |
| *B32B 13/02* | (2006.01) | |
| *B32B 7/04* | (2019.01) | |
| *B32B 5/02* | (2006.01) | |
| *B32B 13/08* | (2006.01) | |
| *C03C 25/1025* | (2018.01) | |
| *C04B 11/00* | (2006.01) | |
| *C04B 14/42* | (2006.01) | |
| *E04C 5/07* | (2006.01) | |
| *C04B 103/00* | (2006.01) | |
| *C04B 111/00* | (2006.01) | |

(52) U.S. Cl.
CPC .............. *B32B 7/04* (2013.01); *B32B 13/02* (2013.01); *B32B 13/08* (2013.01); *B32B 13/14* (2013.01); *C03C 25/103* (2013.01); *C03C 25/28* (2013.01); *C04B 11/005* (2013.01); *C04B 14/42* (2013.01); *E04C 2/043* (2013.01); *E04C 2/06* (2013.01); *E04C 5/073* (2013.01); *B32B 2250/03* (2013.01); *B32B 2250/40* (2013.01); *B32B 2260/021* (2013.01); *B32B 2260/044* (2013.01); *B32B 2262/02* (2013.01); *B32B 2262/0261* (2013.01); *B32B 2262/0269* (2013.01); *B32B 2262/0276* (2013.01); *B32B 2262/065* (2013.01); *B32B 2262/101* (2013.01); *B32B 2262/105* (2013.01); *B32B 2262/106* (2013.01); *B32B 2307/3065* (2013.01); *B32B 2307/50* (2013.01); *B32B 2307/54* (2013.01); *B32B 2307/546* (2013.01); *B32B 2307/558* (2013.01); *B32B 2307/7265* (2013.01); *B32B 2307/734* (2013.01); *B32B 2419/04* (2013.01); *C04B 2103/0066* (2013.01); *C04B 2111/0062* (2013.01)

(58) Field of Classification Search
CPC ......... Y10T 428/2933; Y10T 428/2938; Y10T 428/2964; Y10T 428/31612; Y10T 442/604; Y10T 442/676; Y10T 442/678; C03C 5/28; C03C 5/12; C03C 5/103; E04C 2/043; E04C 5/073; C04B 11/005; C04B 14/42; C04B 20/1033; C04B 2111/0062; C04B 2103/0066; B32B 13/02; B32B 13/14; B32B 2250/03; B32B 2250/40; B32B 2260/021; B32B 2260/044; B32B 2262/101
USPC ..... 65/448; 57/249, 250; 525/106, 420, 421, 525/435, 446, 487; 528/156, 157, 10, 26, 528/28, 335, 342, 345, 38, 59; 442/331, 442/395, 396, 398; 427/178, 212, 434.6, 427/387; 106/238, 287; 428/391, 375, 428/378, 393, 429, 392
See application file for complete search history.

(56) References Cited

U.S. PATENT DOCUMENTS

| | | | |
|---|---|---|---|
| 4,636,437 | A | 1/1987 | Algrim et al. |
| 4,795,678 | A * | 1/1989 | Girgis ................... C03C 25/26 428/375 |
| 5,038,555 | A | 8/1991 | Wu et al. |
| 5,085,938 | A * | 2/1992 | Watkins ................. C03C 25/26 428/375 |
| 5,997,492 | A | 12/1999 | Delmore et al. |
| 6,365,090 | B1 | 4/2002 | Strait et al. |
| 6,988,343 | B2 | 1/2006 | Gleeson et al. |
| 7,138,023 | B2 | 11/2006 | Haque et al. |
| 7,252,729 | B2 | 8/2007 | Haque |
| 7,279,059 | B2 | 10/2007 | Haque |
| 7,820,732 | B2 | 10/2010 | Hossainy et al. |
| 8,580,061 | B2 | 11/2013 | Cik |
| 8,652,288 | B2 | 2/2014 | Blinkhorn et al. |
| 8,674,019 | B2 | 3/2014 | Williamson et al. |
| 9,359,720 | B2 | 6/2016 | Chuda et al. |
| 2003/0219580 | A1 | 11/2003 | Tagge et al. |
| 2006/0137799 | A1 | 6/2006 | Plaque et al. |
| 2006/0141260 | A1 | 6/2006 | Plaque et al. |
| 2007/0009688 | A1 | 1/2007 | Plaque et al. |
| 2007/0009722 | A1 | 1/2007 | Strait |
| 2007/0082199 | A1 | 4/2007 | Schweizer et al. |
| 2008/0213560 | A1 | 9/2008 | Moireau et al. |
| 2008/0245012 | A1 | 10/2008 | Boisvert et al. |
| 2010/0055439 | A1 * | 3/2010 | Lee .......... E04C 2/043 428/294.7 |
| 2015/0175887 | A1 | 6/2015 | Welker |
| 2015/0240163 | A1 | 8/2015 | Welker |

FOREIGN PATENT DOCUMENTS

| | | |
|---|---|---|
| EP | 0415739 B1 | 5/1996 |
| EP | 1980540 A1 | 10/2008 |
| EP | 2161122 A1 | 3/2010 |
| EP | 2102128 B1 | 9/2014 |
| GB | 1364965 A | 8/1974 |
| GB | 1551985 A | 9/1979 |
| JP | 2003002684 A | 1/2003 |
| WO | 1994016129 A1 | 7/1994 |
| WO | 2007044764 A1 | 4/2007 |
| WO | 2009086147 A1 | 7/2009 |
| WO | 2016057733 A1 | 4/2016 |

* cited by examiner

SIZING COMPOSITION FOR WET USE CHOPPED STRAND GLASS FIBERS

RELATED APPLICATIONS

This application is the U.S. national stage entry of PCT/US2017/037594, filed on Jun. 15, 2017, which claims priority to and all benefit of U.S. Provisional Patent Application Ser. No. 62/351,618, filed on Jun. 17, 2016, for SIZING COMPOSITION FOR WET USE CHOPPED STRAND GLASS FIBERS, the entire disclosures of which are fully incorporated herein by reference.

FIELD

The general inventive concepts relate to sizing compositions, and more particularly to sizing compositions for wet use chopped strand (WUCS) glass fibers used to reinforce gypsum board.

BACKGROUND

Wall boards formed of a gypsum core sandwiched between facing layers are commonly used in the construction industry as internal walls and ceilings for both residential and commercial buildings. Facing materials advantageously contribute flexibility, nail pull resistance, and impact strength to the materials forming the gypsum core. In addition, the facing material can provide a durable surface and other desirable properties (e.g., a decorative surface) to the gypsum board. The gypsum core typically contains gypsum and other components such as reinforcing fibers, water resistant chemicals, binders, accelerants, and low-density fillers.

Glass fibers are commonly used in the production of gypsum wall boards to improve mechanical strength, such as flexural strength and impact strength. The individual glass filaments are typically bundled in large numbers to form a fiber which is packaged to form a roving. The roving, in turn, may be employed in many forms. For example, the glass fibers may be used in chopped form and incorporated into a gypsum matrix or they may be assembled into woven or non-woven fabrics or mats and utilized as the facing material. The glass fibers may be formed by drawing molten glass into filaments through a bushing or orifice plate and applying an aqueous sizing composition containing lubricants, coupling agents, and film formers. The sizing composition provides protection to the fibers from interfilament abrasion and promotes compatibility between the glass fibers and the matrix in which the glass fibers are to be used. After the sizing composition is applied, the wet fibers may be gathered into one or more strands, chopped, and collected as wet chopped fiber strands.

These wet chopped fibers may be deposited into a gypsum slurry to serve as reinforcement for a gypsum board formed from the gypsum slurry. However, conventional chopped glass fibers often fail to flow or disperse well in a gypsum slurry. Additionally, conventionally sized glass fibers do not feed well through conventional feeding apparatuses for delivering the chopped glass fibers to the gypsum slurry. As a result, manufacturers are forced to employ a high or increased feeding rate in order to achieve the minimum amount of required glass fibers. Employing a high feed rate can cause an unnecessarily high amount of glass fibers to be present in the final gypsum board. In other instances, conventionally sized glass fibers cannot be fed at high target feed rates, for example 14-20 lbs/min, which can result in less glass fibers being fed into the gypsum slurry than desired.

Furthermore, inconsistent fiber flow rates during feeding can cause an uneven distribution of fiber in the gypsum slurry. For example, a target fiber flow rate may be set during feeding, but due to non-uniform fiber bundle size, fiber defects, or fiber build up during feeding, an inconsistent fiber flow can occur. An uneven distribution of fibers can cause weakness and/or failure of the gypsum board.

Wet chopped fibers used in manufacturing gypsum board may also have a tendency to build up or clump in the feeding system after extended feeding runs. The buildup of fibers can require stoppages in the gypsum board processing line so that the fiber buildup can be removed, which reduces efficiency.

SUMMARY

The general inventive concepts are directed to sizing compositions that include a polyvinylpyrrolidone film former, a silane coupling agent, a lubricant, and a surfactant. The general inventive concepts also relate to wet use chopped strand glass fibers sized with the inventive sizing compositions described herein. The general inventive concepts further relate to gypsum board that includes chopped glass fibers sized with the inventive sizing compositions described herein. By way of example to illustrate various aspects of the general inventive concepts, several exemplary embodiments of sizing compositions, chopped glass fibers, and gypsum board are provided herein.

In one exemplary embodiment, a sizing composition is provided. The sizing composition includes water, a polyvinylpyrrolidone film former, a silane coupling agent, a lubricant, and a surfactant. The polyvinylpyrrolidone film former comprises from 30 wt. % to 50 wt. % of the dry solids of the sizing composition.

In one exemplary embodiment, glass fibers for use in reinforcing gypsum board are provided. The glass fibers comprise a plurality of chopped glass fibers coated with a sizing composition. The sizing composition includes water, a polyvinylpyrrolidone film former, a silane coupling agent, a lubricant, and a surfactant. The polyvinylpyrrolidone film former comprises from 30 wt. % to 50 wt. % of the dry solids of the sizing composition. The sizing composition is present on the chopped glass fibers in an amount of from 0.05% to 0.3% by weight based on the total weight of the sized chopped glass fibers.

In one exemplary embodiment, a gypsum board is provided. The gypsum board includes a gypsum layer having a first major surface and a second major surface. The gypsum layer comprises gypsum and a plurality of chopped glass fibers coated with a sizing composition that are distributed in the gypsum. The sizing composition includes water, a polyvinylpyrrolidone film former, a silane coupling agent, a lubricant, and a surfactant. The polyvinylpyrrolidone film former comprises from 30 wt. % to 50 wt. % of the dry solids of the sizing composition. The gypsum board may also include a first facing layer applied to the first major surface of the gypsum layer and/or a second facing layer applied to the second major surface of the gypsum layer.

DETAILED DESCRIPTION

While various exemplary compositions, articles of manufacture, and methods are described herein, other compositions, articles of manufacture, and methods similar or equivalent to those described herein are encompassed by the general inventive concepts. While the general inventive concepts are susceptible of embodiment in many different forms, several embodiments are described herein in detail with the understanding that the present disclosure is to be considered as an exemplification of the principles of the general inventive concepts. Accordingly, the general inventive concepts are not intended to be limited to the specific embodiments described herein.

The terminology as set forth herein is for description of the embodiments only and should not be construed as limiting the disclosure as a whole. As used in the description and the appended claims, the singular forms "a," "an," and "the" are intended to include the plural forms as well, unless the context clearly indicates otherwise. All references to singular characteristics or limitations of the present disclosure shall include the corresponding plural characteristic or limitation, and vice versa, unless otherwise specified or clearly implied to the contrary by the context in which the reference is made. All materials incorporated by reference are incorporated in their entirety unless otherwise stated. Unless otherwise indicated (e.g., by use of the term "precisely"), all numbers expressing quantities, properties such as molecular weight, reaction conditions, and so forth as used in this disclosure are to be understood as being modified in all instances by the term "about." Accordingly, unless otherwise indicated, the numerical properties set forth in this disclosure are approximations that may vary depending on the desired properties sought to be obtained in the embodiments described herein.

The term "bundle integrity" as used herein refers to the degree to which individual filaments of material (e.g., glass) adhere to each other or, stated another way, the degree to which individual filaments resist separating from a strand in which they were previously formed. Preferably, the sized fibers described herein have sufficient bundle integrity to ensure adequate fiber flow when fed into a slurry or resinous matrix, and also to disperse well in the slurry or matrix, such as a gypsum slurry. A packing density test can be used to evaluate the bundle integrity of fibers. For example, a predetermined weight of fibers can be placed in a container and the level (height) of the fibers in the container can be measured. A lower measured level of the fibers indicates a higher bundle integrity.

The general inventive concepts are directed to a sizing composition that comprises a polyvinylpyrrolidone film former, a silane coupling agent, a lubricant, and a surfactant. The general inventive concepts are also directed to wet use chopped strand glass fibers sized with the inventive sizing composition, as well as gypsum board that includes chopped glass fibers sized with the inventive sizing composition.

The general inventive concepts disclosed herein are based, at least in part, on the discovery that wet use chopped strand (WUCS) glass fibers used in the manufacture of gypsum board flow faster and disperse better when the WUCS fibers exhibit improved bundle integrity. It has been found that WUCS fibers sized with a sizing composition that includes a significant amount of a polyvinylpyrrolidone film former, particularly a high molecular weight polyvinylpyrrolidone film former, exhibit improved bundle integrity, flow rate, flow rate consistency (i.e., less variation in the flow rate as compared to a target flow rate), and dispersibility of the WUCS fibers in the gypsum matrix or slurry.

In one exemplary embodiment, a sizing composition is provided. The sizing composition comprises a polyvinylpyrrolidone film former, a silane coupling agent, a lubricant, and a surfactant. The polyvinylpyrrolidone film former comprises from 30 wt. % to 50 wt. % of the dry solids of the sizing composition.

The exemplary sizing compositions disclosed herein include a polyvinylpyrrolidone film former. In general, film formers are used in sizing compositions for glass fibers to protect the glass fibers from interfilament abrasion in the fiberizing process. The film formers also promote bonding of the glass fibers together at various contact points along the fibers, which imparts effective strand or bundle integrity such that the integrity is maintained during subsequent processing. As mentioned above, it has been found that a sizing composition that includes a significant amount of a polyvinylpyrrolidone film former can improve the bundle integrity of WUCS fibers.

Polyvinylpyrrolidone is a water-soluble polymer made from the monomer N-vinyl-2-pyrrolidone. The four most common commercial grades of polyvinylpyrrolidone are K-15, K-30, K-60, and K-90, which have the following corresponding weight average molecular weights (Mw): 6,000 to 15,000 Da for PVP K-15; 40,000 to 80,000 Da for PVP K-30; 390,000 to 470,000 Da for PVP K-60; and 1,000,000 to 1,700,000 Da for PVP K-90. The various grades of polyvinylpyrrolidone film former are commercially available from numerous suppliers, including Ashland Specialty Ingredients (Wilmington, Del.).

In certain exemplary embodiments, the polyvinylpyrrolidone film former used in the sizing composition comprises the K-90 grade of polyvinylpyrrolidone, which has a weight average molecular weight of 1,000,000 to 1,700,000 Da. In certain exemplary embodiments, the film former used in the sizing composition comprises one or more of the various grades of polyvinylpyrrolidone. Preferably, the polyvinylpyrrolidone film former used in the sizing compositions disclosed herein has a weight average molecular weight of 1,000,000 to 1,700,000 Da.

In accordance with the exemplary embodiments disclosed herein, the polyvinylpyrrolidone film former comprises from 30 wt. % to 50 wt. % of the dry solids of the sizing composition. In certain exemplary embodiments, the polyvinylpyrrolidone film former comprises from 35 wt. % to 50 wt. % of the dry solids of the sizing composition, including from 35 wt. % to 45 wt. %, from 38 wt. % to 45 wt. %, and also including from 40 wt. % to 43 wt. % of the dry solids of the sizing composition. In certain of the foregoing exemplary embodiments, the polyvinylpyrrolidone film former of the sizing composition has a weight average molecular weight of 1,000,000 to 1,700,000 Da.

The exemplary sizing compositions disclosed herein also include a lubricant. In certain exemplary embodiments, the lubricant comprises a fatty amide lubricant that is the condensation product of a saturated fatty acid having at least 16 carbon atoms and a polyamine. Non-limiting examples of suitable saturated fatty acids for use in forming the fatty amide lubricant include, but are not limited to, palmitic acid, margaric acid, stearic acid, arachidic acid, and combinations thereof. In certain exemplary embodiments, the saturated fatty acids for use in forming the fatty amide lubricant comprise a saturated fatty acid with a straight alkyl chain having a water solubility of less than about 0.003 g/liter in water, such as stearic acid. In certain exemplary embodiments, the saturated fatty acid for use in forming the fatty amide lubricant is stearic acid.

The polyamine for use in forming the fatty amide lubricant may be a low to high molecular weight polyamine in which the amine linkages or amine groups occur along the molecular chain. Polyamines suitable for forming the primary fatty amide lubricant include tertiary amines having a low molecular weight, such as, for example, where the alkyl groups attached to the amine nitrogen atom have from 1 to 6 carbon atoms. As used herein, the term "low molecular weight polyamine" is meant to indicate a polyamine having a molecular weight of 50 Da to 200 Da, and the term "high molecular weight polyamine" is meant to indicate a polyamine having a molecular weight in the range of 400 Da to 2,000 Da. In certain exemplary embodiments, the polyamine for use in forming the fatty amide lubricant has a molecular weight of 100 Da to 800 Da. Non-limiting examples of suitable polyamines that may be used to form the fatty amide lubricant include, but are not limited to, tetraethylenepentamine (TEPA), diethylenetriamine (DETA), tetraethylenetriamine (TETA), ethylene diamine, diethylene triamine, triethylene tetramine, and pentaethylene hexamine. In certain exemplary embodiments, the polyamine used to form the fatty amide lubricant is tetraethylenepentamine.

As mentioned above, in certain exemplary embodiments, the lubricant is a fatty amide lubricant that comprises a condensation reaction product of a saturated fatty acid having at least 16 carbon atoms and a polyamine. In certain exemplary embodiments, the saturated fatty acid used to form the fatty amide lubricant is stearic acid and the polyamine used to form the fatty amide lubricant is tetraethylenepentamine.

Commercially available lubricants suitable for use in the exemplary sizing compositions disclosed herein include, but are not limited to, Lubesize K-12 (a condensation reaction product of stearic acid and tetraethylenepentamine) from AOC, LLC (Collierville, Tenn.), Katax 8726 from Pulcra Chemicals, LLC (Rock Hill, S.C.), Stantex G-8145 from Pulcra Chemicals, LLC (Rock Hill, S.C.), and Lubril Cat-X/VC from Hexion, Inc. (Columbus, Ohio).

In certain exemplary embodiments, the sizing composition includes a lubricant in an amount such that the lubricant comprises from 30 wt. % to 50 wt. % of the dry solids of the sizing composition. In certain exemplary embodiments, the lubricant comprises from 35 wt. % to 50 wt. % of the dry solids of the sizing composition, including from 35 wt. % to 45 wt. %, from 38 wt. % to 45 wt. %, and also including from 40 wt. % to 43 wt. % of the dry solids of the sizing composition. In certain of the foregoing exemplary embodiments, the lubricant is a fatty amide lubricant that comprises a condensation reaction product of a saturated fatty acid having at least 16 carbon atoms and a polyamine. In certain of the foregoing exemplary embodiments, the saturated fatty acid used to form the fatty amide lubricant is stearic acid and the polyamine used to form the fatty amide lubricant is tetraethylenepentamine.

The exemplary sizing compositions disclosed herein impart excellent bundle integrity to fibers sized with the exemplary sizing compositions. Without being bound by any particular theory, it is believed that the amount of polyvinylpyrrolidone film former used in the exemplary sizing compositions is a major factor for achieving the observed improvement in fiber bundle integrity. However, it is also believed that the relative amounts of the polyvinylpyrrolidone film former and the lubricant play a significant role in achieving excellent fiber bundle integrity. As previously mentioned, improving fiber bundle integrity may improve the flow rate of the fibers when used in a gypsum matrix or slurry.

Accordingly, in certain exemplary embodiments, the sizing composition comprises a polyvinylpyrrolidone film former and a lubricant in amounts such that a weight ratio, based on dry solids, of the polyvinylpyrrolidone film former to the lubricant is from 0.6:1 to 1.7:1. In certain exemplary embodiments, the weight ratio, based on dry solids, of the polyvinylpyrrolidone film former to the lubricant in the sizing composition is from 0.6:1 to 1.5:1, including from 0.7:1 to 1.4:1, from 0.8:1 to 1.3:1, from 0.9:1 to 1.2:1, from 0.95:1 to 1.1:1, and also including from 0.98:1 to 1.05:1.

The exemplary sizing compositions disclosed herein include a silane coupling agent. The silane coupling agent may be in a partially or a fully hydrolyzed state or in a non-hydrolyzed state. The silane coupling agent may also be in monomeric, oligomeric, or polymeric form prior to, during, or after its use. The silane coupling agent functions to enhance the adhesion of film forming polymers to the glass fibers and to reduce the level of fuzz, or broken fiber filaments, during subsequent processing. Examples of silane coupling agents that may be used in the sizing compositions disclosed herein may be characterized by the functional groups amino, epoxy, vinyl, methacryloxy, ureido, isocyanato, and azamido.

Examples of particular silane coupling agents suitable for use in the sizing composition include, but are not limited to, γ-aminopropyltriethoxysilane (A-1100), n-trimethoxy-silyl-propyl-ethylene-diamine (A-1120), γ-glycidoxypropyltrimethoxysilane (A-187), γ-methacryloxypropyltrimethoxysilane (A-174), n-βaminoethyl-γ-aminopropyltrimethoxysilane (A-1120), methyltrichlorosilane (A-154), methyltrimethoxysilane (A-163), γ-mercaptopropyl-trimethoxy-silane (A-189), γ-chloropropyl-trimethoxy-silane (A-143), vinyl-triethoxy-silane (A-151), vinyl-tris-(2-methoxyethoxy)silane (A-2171), vinyl-triacetoxy silane (A-188), octyltriethoxysilane (A-137), methyltriethoxysilane (A-162), and methyltrimethoxysilane (A-1630). All of the silane coupling agents listed herein are commercially available as Silquest products from Momentive Performance Materials, Inc. (Waterford, N.Y.).

In certain exemplary embodiments, the silane coupling agent is selected from the group consisting of an amino silane, a methacryloxy silane, a silane ester, a vinyl silane, an epoxy silane, a sulfur silane, a ureido silane, an isocyanato silane, an azamido silane, and combinations thereof. In certain exemplary embodiments, the silane coupling agent comprises an amino silane. In certain exemplary embodiments, the silane coupling agent comprises γ-aminopropyltriethoxysilane (A-1100).

In certain exemplary embodiments, the sizing composition includes a silane coupling agent in an amount such that the silane coupling agent comprises from 2 wt. % to 10 wt. % of the dry solids of the sizing composition. In certain exemplary embodiments, the silane coupling agent comprises from 4 wt. % to 10 wt. % of the dry solids of the sizing composition, including from 4 wt. % to 8 wt. %, and also including from 5 wt. % to 7 wt. % of the dry solids of the sizing composition. In certain of the foregoing exemplary embodiments, the silane coupling agent is selected from the group consisting of an amino silane, a methacryloxy silane, a silane ester, a vinyl silane, an epoxy silane, a sulfur silane, a ureido silane, an isocyanato silane, an azamido silane, and combinations thereof. In certain of the foregoing exemplary embodiments, the silane coupling agent comprises an amino silane. In certain of the foregoing exemplary embodiments, the silane coupling agent comprises γ-aminopropyltriethoxysilane (A-1100).

The exemplary sizing compositions disclosed herein include a surfactant. The surfactant functions to promote the stability of the sizing composition and also aids in dispersing the fibers sized with the sizing composition when they are added to a gypsum matrix or slurry. Examples of suitable surfactants that may be used in the sizing compositions disclosed herein include, but are not limited to, polyalkylene glycol fatty acids and esters thereof (e.g., polyethylene glycol monooleate, polyethylene glycol monostearate, polyethylene glycol monoisostearate), poloxamers, poloxamines, and combinations thereof.

In certain exemplary embodiments, the surfactant used in the sizing composition comprises a polyethylene glycol fatty acid ester surfactant. In certain exemplary embodiments, the polyethylene glycol fatty acid ester surfactant comprises polyethylene glycol monooleate, wherein the polyethylene glycol moiety has a molecular weight of 380 Da to 420 Da (i.e., PEG400 MO). An exemplary commercially available polyethylene glycol monooleate surfactant, wherein the polyethylene glycol moiety has a molecular weight of 380 Da to 420 Da, that is suitable for use in the sizing compositions disclosed herein is Mapeg® 400 MO from BASF Corporation (Florham Park, N.J.).

In certain exemplary embodiments, the surfactant used in the sizing composition comprises a poloxamer, a poloxamine, or both a poloxamer and a poloxamine. In general, poloxamers and poloxamines are amphiphilic block copolymers that include hydrophilic blocks of ethylene oxide (EO) and hydrophobic blocks of propylene oxide (PO) monomer units. Poloxamers are a-b-a type triblock copolymers (PEO-PPO-PEO), while poloxamines are tetrablock copolymers of PEO-PPO connected through ethylenediamine bridges [(PEO-PPO)$_2$—N—CH$_2$—CH$_2$—N—(PPO-PEO)$_2$]. An exemplary commercially available poloxamer that is suitable for use in the sizing compositions disclosed herein is Pluronic® 10R5 (a reverse triblock copolymer, i.e., PPO-PEO-PPO) from BASF Corporation (Florham Park, N.J.). An exemplary commercially available poloxamine that is suitable for use in the sizing compositions disclosed herein is Tetronic® 908 from BASF Corporation (Florham Park, N.J.).

In certain exemplary embodiments, the sizing composition includes a surfactant in an amount such that the surfactant comprises from 5 wt. % to 15 wt. % of the dry solids of the sizing composition. In certain exemplary embodiments, the surfactant comprises from 6 wt. % to 15 wt. % of the dry solids of the sizing composition, including from 8 wt. % to 15 wt. %, from 10 wt. % to 15 wt. %, and also including from 10 wt. % to 12 wt. % of the dry solids of the sizing composition. In certain of the foregoing exemplary embodiments, the surfactant used in the sizing composition comprises a polyethylene glycol fatty acid ester surfactant. In certain of the foregoing exemplary embodiments, the polyethylene glycol fatty acid ester surfactant comprises polyethylene glycol monooleate, wherein the polyethylene glycol moiety has a molecular weight of 380 Da to 420 Da (i.e., PEG400 MO). In certain of the foregoing exemplary embodiments, the surfactant comprises a poloxamer.

In certain exemplary embodiments, the sizing compositions disclosed herein include a weak acid. The weak acid may be used to adjust the pH of the sizing composition, as well as to hydrolyze the alkoxy functional groups of the silane coupling agent. The weak acid may comprise one or more weak acids. Examples of suitable weak acids that can be used in the sizing compositions disclosed herein include, but are not limited to, acetic acid, succinic acid, citric acid, and combinations thereof. The sizing compositions disclosed herein have a pH of from 3.5 to 6, preferably from 4 to 6, and more preferably about 5. Given the pH range, one skilled in the art would be able to select the type and amount of weak acid for use in the sizing compositions disclosed herein. In accordance with certain embodiments, the sizing compositions disclosed herein comprise a weak acid in an amount of from 0.05 wt. % to 0.4 wt. % of the sizing composition, including from 0.1 wt. % to 0.35 wt. %, from 0.1 wt. % to 0.3 wt. %, from 0.1 wt. % to 0.25 wt. %, from 0.15 wt. % to 0.25 wt. %, and also including from 0.2 wt. % to 0.25 wt. % of the sizing composition. Preferably, the weak acid used in the sizing composition is acetic acid.

The sizing composition may also include conventional additives such as dyes, oils, fillers, thermal stabilizers, anti-foaming agents, anti-oxidants, dust suppression agents, wetting agents, antimicrobial agents, fungicides, biocides, and/or other conventional additives. The amount of additives in the sizing composition is preferably not in excess of 2 wt. % based on the dry solids of the sizing composition.

The exemplary sizing compositions disclosed herein also include water. The sizing composition contains an amount of water sufficient to dilute the solids of the size composition to a viscosity that is suitable for application to glass fibers. In accordance with certain exemplary embodiments, the sizing composition comprises water in an amount of from 90 wt. % to 99.5 wt. % of the sizing composition, including from 92 wt. % to 99 wt. %, from 94 wt. % to 98 wt. %, and also including water in an amount of from 95 wt. % to 98 wt. % of the sizing composition. The total solids content, or amount of dry solids, of the sizing composition may be from 0.5 wt. % to about 10 wt. %, including from 1 wt. % to 8 wt. %, from 2 wt. % to 6 wt. %, from 2 wt. % to 5 wt. %, and also including from 2 wt. % to 4 wt. %. Preferably, the sizing composition has a total solids content of 2 wt. % to 5 wt. %. The total solids content of the sizing composition may be modified, for example, depending on the nature of the sized glass, the surface properties of the glass composition, and when it is desired to generate differences in glass surface wettability.

The sizing composition may be prepared by adding a weak acid to deionized water in a container. Next, a silane coupling agent is added to the container and allowed to hydrolyze for about 5 to 10 minutes. After the hydrolyzation of the silane coupling agent, the lubricant, the polyvinyl pyrrolidone film former, and the surfactant are added to form a mixture. If necessary, the pH of the mixture may be adjusted to a desired level. The resulting sizing composition may be diluted with additional deionized water to achieve a target total solids content.

The sizing composition may be applied to glass filaments that are formed by conventional techniques such as by drawing molten glass through a heated bushing to form substantially continuous glass fibers. Any type of glass, such as A-type glass, C-type glass, E-type glass, S-type glass, or modifications thereof is suitable for use as the fiber material. For example, in one modification of E-type glass, the boron oxide is replaced by magnesium oxide. Such a glass is commercially available from Owens Corning Composite Materials, LLC (Toledo, Ohio) under the trade name Advantex™.

In one exemplary embodiment, glass fibers for use in reinforcing gypsum board are provided. The glass fibers comprise a plurality of chopped glass fibers coated with the presently disclosed sizing composition. Any of the previously disclosed and described embodiments of the sizing composition may be present on the chopped glass fibers. The chopped glass fibers may be formed by conventional processes known in the art. In certain exemplary embodiments, the chopped glass fibers are wet use chopped strand (WUCS) glass fibers. In general, WUCS glass fibers are a low cost reinforcement that provide impact resistance, dimensional stability, and improved mechanical properties such as improved strength and stiffness to a finished product, such as gypsum board. In certain exemplary embodiments, the WUCS glass fibers coated with the exemplary sizing compositions disclosed herein have a moisture content of from 2 wt. % to 15 wt. %, including from 4 wt. % to 12 wt. %, and also including a moisture content of from 5 wt. % to 10 wt. %.

The exemplary sizing compositions disclosed herein may also be applied to other reinforcing fibers such as natural fibers, mineral fibers, carbon fibers, ceramic fibers, and/or synthetic fibers such as polyester, polyamide, and/or aramid fibers. The term "natural fiber" as used in conjunction with the present disclosure to refers to plant fibers extracted from any part of a plant, including, but not limited to, the stem, seeds, leaves, roots, or bast. However, the exemplary sizing composition disclosed herein is preferably applied to glass fibers, particularly WUCS fibers, due to their low cost and high tensile strength and modulus. As described in detail below, WUCS fibers sized with the exemplary sizing compositions disclosed herein may be used to reinforce gypsum board. By using WUCS fibers, the gypsum board has the mechanical properties to take nails and screws in construction processes without cracking or other mechanical failures. The sized WUCS glass fibers have an additional advantage of being easily mixed and may be fully dispersed in a gypsum matrix or slurry, as discussed in detail below. The presence of synthetic fibers may be advantageous when higher impact resistance is sought. In general, the inclusion of organic fibers is typically not desirable because these fibers detract from mold resistance, which is a desirable feature in gypsum board applications.

In one exemplary embodiment, the sizing composition is applied to the fibers (e.g., WUCS glass fibers) such that the sizing composition is present on the fibers in an amount of from 0.05 wt. % to 0.3 wt. % based on the total weight of the sized fibers. The amount of sizing composition present on the fibers is also referred to as "strand solids content." In certain exemplary embodiments, the sizing composition is present on the fibers in an amount of from 0.1 wt. % to 0.2 wt. % based on the total weight of the sized fibers. This can be determined by the loss on ignition (LOI) of the sized fibers, which is the reduction in weight experienced by the sized fibers after heating them to a temperature sufficient to burn or pyrolyze the sizing composition from the fibers. The sizing composition may be applied to fibers of varying diameters, including fibers having a diameter of from 10 microns to 23 microns, and further including fibers having a diameter of 14 microns to 18 microns.

The sizing composition may be applied to the fibers in any conventional manner using any conventional application such as by spraying or drawing the fibers to be sized across a rotating or stationary roll wet with the sizing composition. The sizing composition is preferably applied to the fibers in an amount sufficient to provide the fibers with a moisture content of 5 wt. % to 10 wt. % based on the total weight of the fibers.

In one exemplary embodiment, glass fibers are sized with an embodiment of the sizing composition disclosed herein and are processed and packaged as wet use chopped strand glass fibers that are subsequently used to form a gypsum board. For example, the sized WUCS fibers are deposited into a gypsum matrix or slurry that is used to form a gypsum board. The gypsum slurry may be a conventional gypsum slurry that includes water, gypsum, various accelerants, binders, and water repellency chemicals. Gypsum, also known as calcium sulfate dihydrate ($CaSO_4 \cdot 2H_2O$), is a natural mineral derived from the earth. When calcined, three quarters of the water of crystallization is driven off to produce calcium sulfate hemihydrate ($CaSO_4 \cdot \frac{1}{2}H_2O$). If the calcination is carried out under pressure, an α-form of gypsum is produced. The α-gypsum has regular, needle (acicular), or rod shaped particles. On the other hand, if the calcination is conducted at atmospheric pressure, a β-form of gypsum is produced with porous, irregularly-shaped particles. Although the gypsum in the slurry may be α-gypsum, β-gypsum, or a combination thereof, β-gypsum is more preferred due to its lower cost and increased ability to absorb water as compared to α-gypsum. One advantage of gypsum-based materials in general is that they can be shaped, molded, and processed within a short period of time due to gypsum's naturally occurring rapid setting and hardening characteristics. In addition, the gypsum exhibits a level of fire resistance.

The gypsum slurry may include additional components to modify properties of the gypsum board. For example, low density fillers may be added to reduce the cost, the overall density of the gypsum board, and may also be used as an extender. If a denser board is desired, a more dense filler, such as calcium carbonate may be used. In addition, one or more polymeric resins that are at least partially dispersible in water, and most preferably, fully dispersible in water may be included in the gypsum slurry. The polymeric resin provides strength, flexibility, toughness, durability, and water resistance to the final product. Additionally, the presence of at least one coupling agent in the gypsum slurry may provide added desirable attributes. For example, the presence of a coupling agent helps to bond the polymer resin and filler (e.g., perlite) components of the gypsum slurry. In particular, the addition of a coupling agent to the gypsum slurry increases the bond strength between perlite, a preferred filler, and the polymer.

In one exemplary embodiment, a gypsum board is provided. The gypsum board comprises a gypsum core having a first major surface and a second major surface. The gypsum core comprises gypsum and a plurality of chopped glass fibers having the exemplary sizing composition disclosed herein applied thereto and distributed in the gypsum. As previously described, the sizing composition includes water, a polyvinylpyrrolidone film former, a silane coupling agent, a lubricant, and a surfactant. The polyvinylpyrrolidone film former comprises from 30 wt. % to 50 wt. % of the dry solids of the sizing composition. The gypsum board also includes a first facing layer applied to the first major surface of the gypsum core and a second facing layer applied to the second major surface of the gypsum core.

Figure 1:
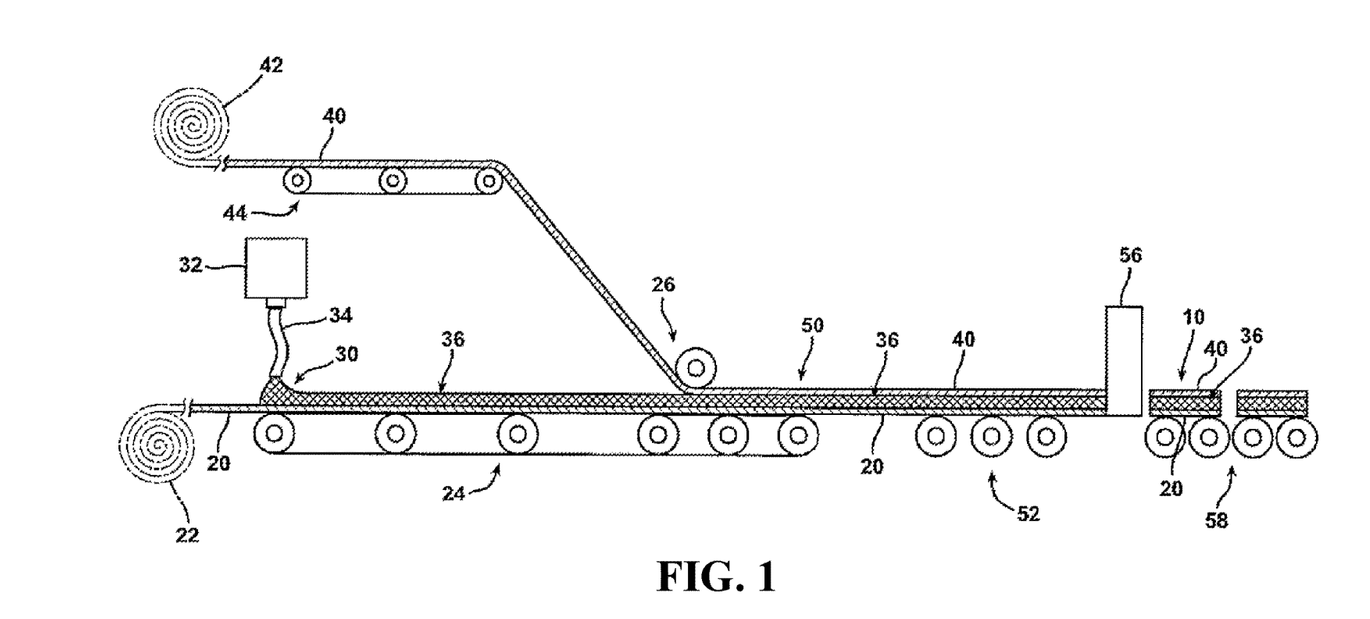
FIG. 1 is a schematic illustration of an exemplary processing line for forming a gypsum board.

A gypsum slurry containing a plurality of sized glass fibers may be used to form a gypsum board, such as is illustrated in FIG. 1. In at least one exemplary embodiment, a first facer material 20 is fed from a supply roll 22 and conveyed by a first conveying apparatus 24 (e.g., a conveyor) to a forming area 26. In certain exemplary embodiments, the first conveying apparatus 24 is a conveyor belt. The first facing layer 20 may be selected from materials that provide desired physical, mechanical, and/or aesthetic properties. Examples of materials that may be used as the first facing layer 20 include a glass fiber scrim, a veil or fabric, woven or non-woven materials, and paper or other cellulosic items. Facing layers advantageously contribute flexibility, nail pull resistance, and/or impact strength to the materials forming the gypsum core of the gypsum board. In addition, the facing layers can provide a fairly durable surface and/or other desirable properties such as a decorative surface to gypsum boards. In certain exemplary embodiments, fibrous mats are used as the first facing material 20. The physical characteristics of the gypsum board 10 are at least partially dependent upon the type of fibrous mat chosen as the first and/or second facing layers 20, 40, and it is to be appreciated that not all fibrous mats will provide the same physical characteristics.

In certain exemplary embodiments, a gypsum slurry containing the sized glass fibers 30 is deposited from a gypsum supply 32 via a depositing apparatus such as a hose 34 or a series of hoses (not shown) to the first facing layer 20. The gypsum slurry 30 may be a gypsum slurry such as described above. A second facing material 40 is fed from a supply roll 42 and is simultaneously conveyed to the forming area 26 by a second conveying apparatus 44. The second facing material 40 may be the same as, or different from, the first facing material 20. It is preferred, however, that the first and second facing layers 20, 40 are the same as or similar to each other to avoid warpage. At the forming area 26, the second facing material 40 is applied to the gypsum layer 36 in a manner such that the second facing material 40 is placed in contact with the gypsum layer 36. The forming area 26 and the amount of gypsum slurry 30 that is deposited onto the first facing material 20 are selected such that the gypsum slurry 30 is compressed into both first and second facing materials 20,40. For instance, fibrous mats used as the first and second facing materials 20,40 mechanically interlock with the gypsum layer 36. As a result, no chemical additives or adhesives are needed to bond the first and second facing layers 20, 40 and the gypsum layer 36 when fibrous mats are used as the facing materials. The resulting product is an intermediate sandwiched gypsum composite 50 formed of a gypsum layer 36 sandwiched between the first and second facing layers 20, 40.

The intermediate sandwiched gypsum composite product 50 is preferably initially supported by a conveyor (e.g., the first conveying apparatus 24) or other similar conveying apparatus. After sufficient green strength is obtained, which arises from the natural reactions of the gypsum over time, the conveyor belt 24 ends and a series of rollers 52 convey the intermediate sandwiched gypsum product 50 to a cutting apparatus 56 (e.g., a knife) where the intermediate gypsum product 50 is cut into individual gypsum boards 10. The gypsum board 10 is formed of an inner gypsum layer 36 bonded to the first and second facing materials 20,40. Although a conveyer 24 and a series of rollers 52 are depicted as carrying devices for the intermediate sandwiched gypsum composite 50, it is to be appreciated that a series of conveyors or other similar conveying apparatuses known to those of skill in the art could be used to carry the intermediate sandwiched gypsum composite product 50 from the forming area 26 to the cutting apparatus 56.

After the intermediate sandwiched gypsum composite 50 has been cut into discrete gypsum boards 10, the gypsum boards 10 may be subsequently conveyed by a second series of rollers 58 to a drying apparatus (not shown) such as a multi-zone dryer to facilitate further drying of the gypsum layer. The distance from the forming area 26 to the cutting apparatus 56 is a distance sufficient to provide a green strength that is strong enough to cut the intermediate sandwiched gypsum product 50 into the gypsum boards 10 without any breakage or warpage of the gypsum boards 10. In practice, the distance may be a distance of 200 or more feet, depending on the line speed.

Figure 2:
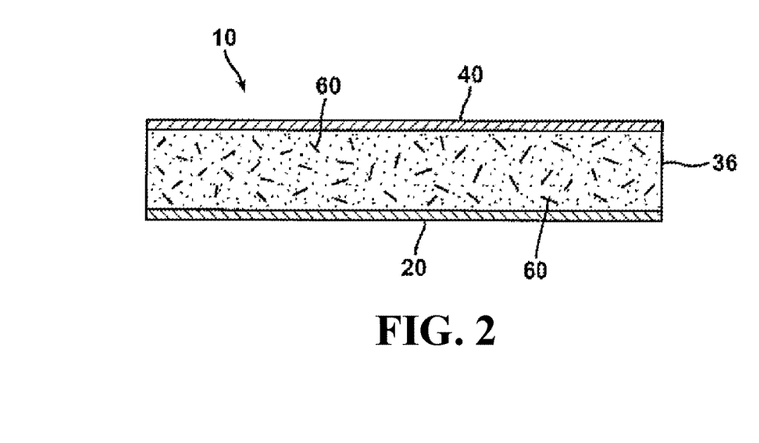
FIG. 2 illustrates an exemplary embodiment of a gypsum board as described herein.

A gypsum board 10 formed according to the present disclosure is depicted in FIG. 2. As shown in FIG. 2, the sized glass fibers 60 are substantially evenly distributed within the gypsum layer 36. It has been discovered that the sizing composition present on the glass fibers permits the fibers to substantially evenly disperse in the gypsum slurry. As used herein, the term "substantially evenly disperse" means that the glass fibers are evenly or nearly evenly distributed within the gypsum slurry. In other words, a noticeable improvement in the distribution of the glass fibers throughout the gypsum slurry is achieved as compared to glass fibers having conventional sizings applied thereto. Consequently, there is a reduction in areas within the gypsum slurry having too few (including none) or too many glass fibers. An even, or nearly even, distribution of the fibers within the gypsum slurry, attributable to the inventive sizing composition, provides for enhanced mechanical strength in the gypsum board. In particular, the sizing composition permits the sized fibers to more readily flow into the gypsum slurry, thereby achieving the substantially even distribution of fibers within the gypsum layer of the gypsum board.

A number of advantages are provided by the exemplary sizing compositions disclosed herein. For example, the sizing composition provides improved flowability of the glass fibers in a gypsum slurry with a concurrent reduction in the amount of energy or power required to feed the fibers into the slurry. Additionally, more consistent flow rates of the glass fibers within the gypsum slurry are achieved when the fibers are sized with the exemplary sizing compositions disclosed herein. Further, it has been determined that fibers sized with the exemplary sizing compositions disclosed herein exhibit improved dispersion in the gypsum slurry.

EXAMPLES

The following examples illustrate exemplary embodiments of sizing compositions and WUCS glass fibers sized with the sizing compositions as disclosed and described herein. The exemplary embodiments are provided solely for the purposes of illustration and should not be construed as limiting the present disclosure. Numerous variations of the specific embodiments are possible without departing from the spirit and scope of the sizing compositions and WUCS glass fibers sized with the sizing compositions as disclosed and described herein.

Examples 1 & 2

Examples 1 and 2 illustrate exemplary sizing compositions according to the general inventive concepts disclosed herein. Sizing compositions were prepared in accordance with the formulations set forth in Table 1. The amount of materials used to prepare the sizing compositions are listed as kilogram per 1,000 kilograms of the sizing composition. The sizing compositions were prepared in the following manner. Deionized water and acetic acid were added to a container. The silane coupling agent (A-1100) was then added to the container with agitation to hydrolyze the silane coupling agent (A-1100). After the hydrolyzation of the silane coupling agent (A-1100), the polyvinylpyrrolidone film former (PVP K-90), the lubricant (Lubesize K12), and the surfactant (PEG400 MO) were added and mixed to form the sizing composition. The sizing composition was then diluted with water to achieve the desired total solids content (mix solids). The final sizing composition was then mixed to obtain a homogenous solution.

TABLE 1

| Component | % Active Solids | Example 1 kg/1000 kg | Example 2 kg/1000 kg |
|---|---|---|---|
| Acetic Acid | — | 2.15 | 1.39 |
| A-1100 (silane coupling agent) | 58 | 4.28 | 2.77 |
| Lubesize K12 (lubricant) | 8.8 | 166.48 | 107.54 |
| PEG400 MO (surfactant) | 100 | 3.31 | 2.64 |
| PVP K-90 (film former) | 6 | 243.07 | 157.02 |
| D.I. Water | — | 580.7 | 728.63 |
| Total Solids Content (Mix Solids) | | ~3.5% | ~2.31% |

The sizing compositions of Examples 1 and 2 were applied to glass fibers in a conventional manner (such as by a roll-type applicator) and subsequently cut to form WUCS glass fibers. The fiber moisture content for Examples 1 and 2 was from about 6.8 wt. % to about 7.1 wt. %. The strand solids content for Example 1 was about 0.2 wt. %, while the strand solids content for Example 2 was about 0.16 wt. %. The WUCS glass fibers with the sizing compositions of Examples 1 and 2 had a fiber length of about one-half of an inch and a diameter of about 16 microns.

Example 3

In this example, a series of fiber feeding tests were conducted to evaluate the fiber flow rate and fiber flow consistency of WUCS glass fibers sized with the exemplary sizing compositions according to the general inventive concepts disclosed herein, as compared to a commercially available WUCS glass fiber sized with a conventional sizing composition.

The fiber flow rate and fiber flow consistency were measured by feeding the WUCS glass fibers through a Schenck AccuRate SolidsFlow feeding system. A first feeding test was performed by feeding the WUCS glass fibers at a target rate of 4 lbs/min and recording the motor magnitude required to maintain the target rate. A second feeding test was performed by feeding the WUCS glass fibers at a fixed motor magnitude of 12.64 mA and measuring the amount of fiber fed per minute over a 20 minute time period. A third feeding test was performed by feeding the WUCS glass fibers at a target rate of 14 lbs/min and recording the motor magnitude required to maintain the target rate.

Certain characteristics of the WUCS glass fibers evaluated in this example are provided below in Table 2. The WUCS glass fibers sized with the exemplary sizing compositions disclosed herein are labeled as "Gyp-39." The sizing composition applied to the Gyp-39 WUCS glass fibers is the same as the sizing composition of Example 1 above. The comparative example of WUCS glass fibers evaluated in this example are commercially available WUCS glass fibers and are labeled as "CE1." The components of the sizing composition applied to the CE1 WUCS glass fibers are provided below in Table 3.

TABLE 2

| WUCS Glass Fibers | Moisture | Strand Solids | Fiber Length | Fiber Diameter |
|---|---|---|---|---|
| Gyp-39 | ~7.1% | ~0.165% | ~½ inch | ~16 μm |
| CE1 | ~7.3% | ~0.193% | ~½ inch | ~16 μm |

TABLE 3

| CE1 Sizing Components | % Active Solids | kg/1000 kg |
|---|---|---|
| Acetic Acid | — | 2.81 |
| A-1100 (silane coupling agent) | 58 | 3.71 |
| Lubesize K12 (lubricant) | 8.8 | 311.1 |
| GP-2925* (lubricant/film former) | 20 | 27.44 |
| D.I. Water | — | 655 |
| Total Solids Content (Mix Solids) | | ~3.5% |

*Polyamide resin available from Georgia-Pacific Chemicals

First Feeding Test—

Figure 3:
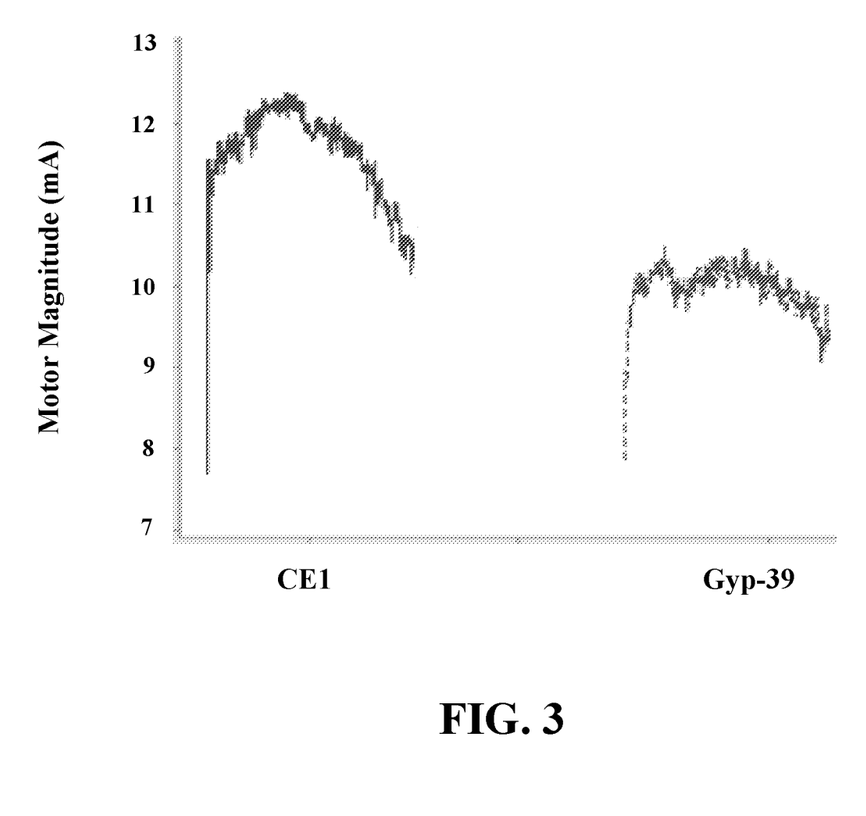
FIG. 3 is a graph showing the variation in motor magnitude when feeding WUCS glass fibers at a target flow rate of 4 lbs/min as described in Example 3.
Figure 4:
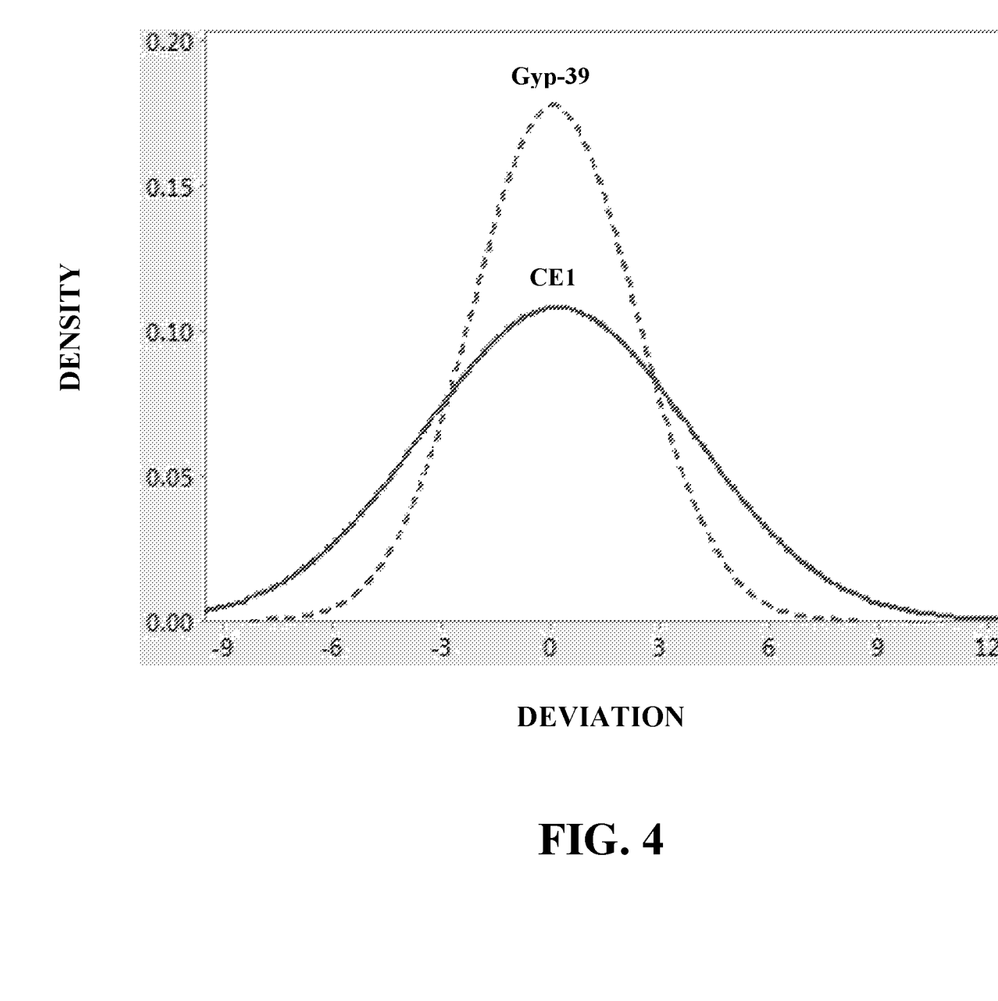
FIG. 4 is a graph showing the deviation from a target flow rate of 4 lbs/min when feeding WUCS glass fibers as described in Example 3.

The first feeding test was performed by separately feeding each of the WUCS glass fibers at a target rate of 4 lbs/min for 30 minutes, and recording the motor magnitude (i.e., energy) required to maintain the target rate. As seen in FIG. 3, the energy required to feed the Gyp-39 WUCS glass fibers at 4 lbs/min was much lower than the energy required to feed the CE1 WUCS glass fibers at 4 lbs/min. The lower energy required during the feeding process demonstrates that the Gyp-39 WUCS glass fibers were easier to feed than the CE1 WUCS glass fibers. Furthermore, FIG. 4 shows that the Gyp-39 WUCS glass fibers had much less deviation during the feeding process than the CE1 WUCS glass fibers. The smaller deviation shows that the flow of Gyp-39 WUCS glass fibers through the feeding system was smoother and more consistent than the flow of the CE1 WUCS glass fibers.

Second Feeding Test—

Figure 5:
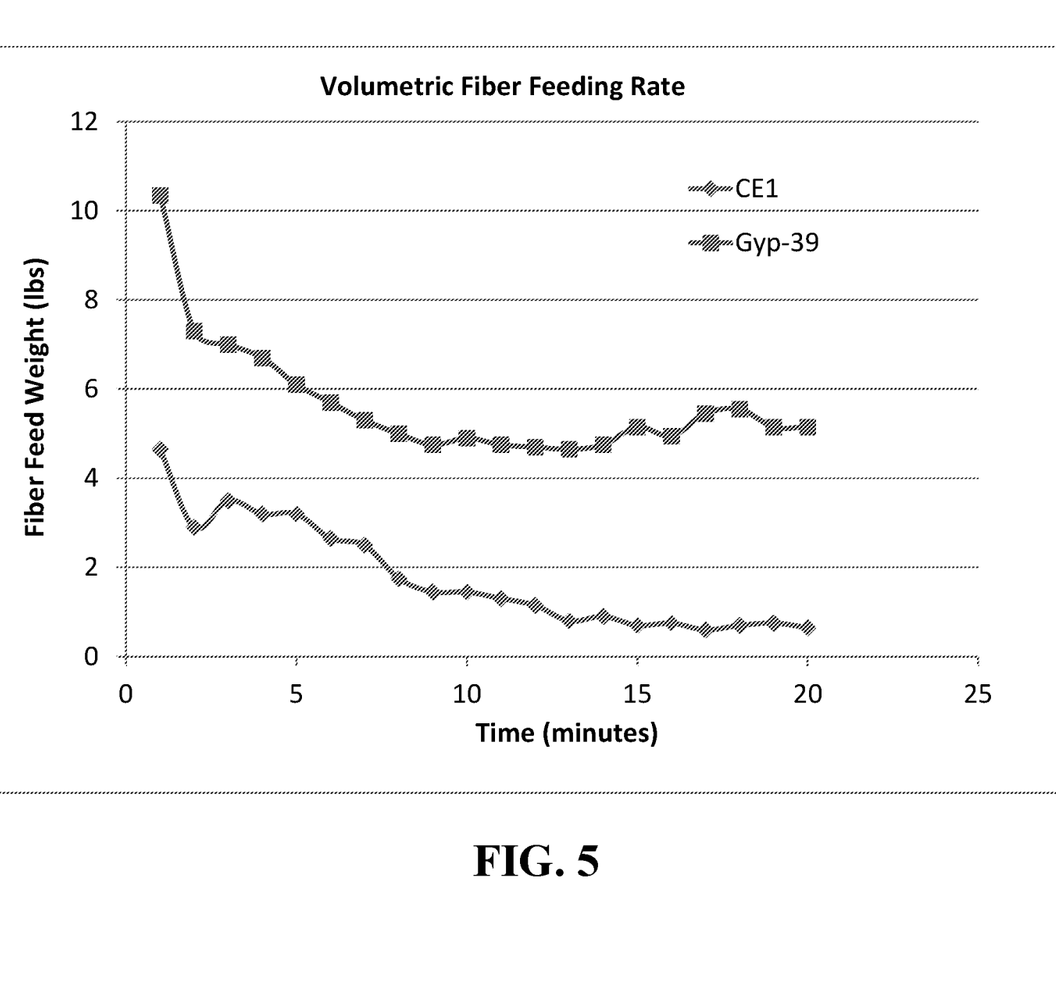
FIG. 5 is a graph showing the amount of WUCS glass fibers fed per minute at a fixed motor magnitude of 12.64 mA as described in Example 3.

The second feeding test was performed by separately feeding each of the WUCS glass fibers at a fixed motor magnitude of 12.64 mA and measuring the amount of fiber fed per minute over a 20 minute time period. Fibers were continuously added to the feeding hopper to maintain a constant total weight of fibers in the hopper during the feeding test. As seen in FIG. 5, the fiber flow rate (lbs/min) of the Gyp-39 WUCS glass fibers was consistently higher than the fiber flow rate of the CE1 WUCS glass fibers over the 20 minute period. The total amount of Gyp-39 WUCS glass fibers fed over the 20 minute period was 113 lbs, whereas the total amount of CE1 WUCS glass fibers fed over the 20 minute period was only 36 lbs.

Third Feeding Test—

Figure 6:
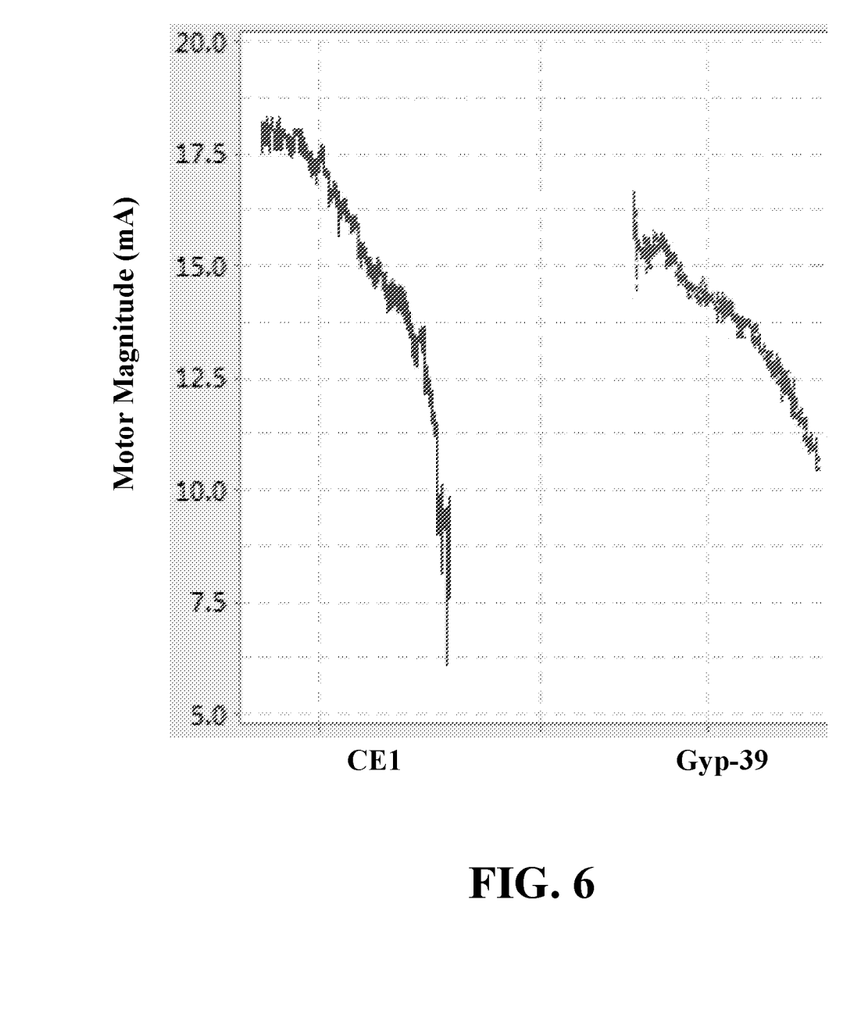
FIG. 6 is a graph showing the variation in motor magnitude when feeding WUCS glass fibers at a target flow rate of 14 lbs/min as described in Example 3.
Figure 7:
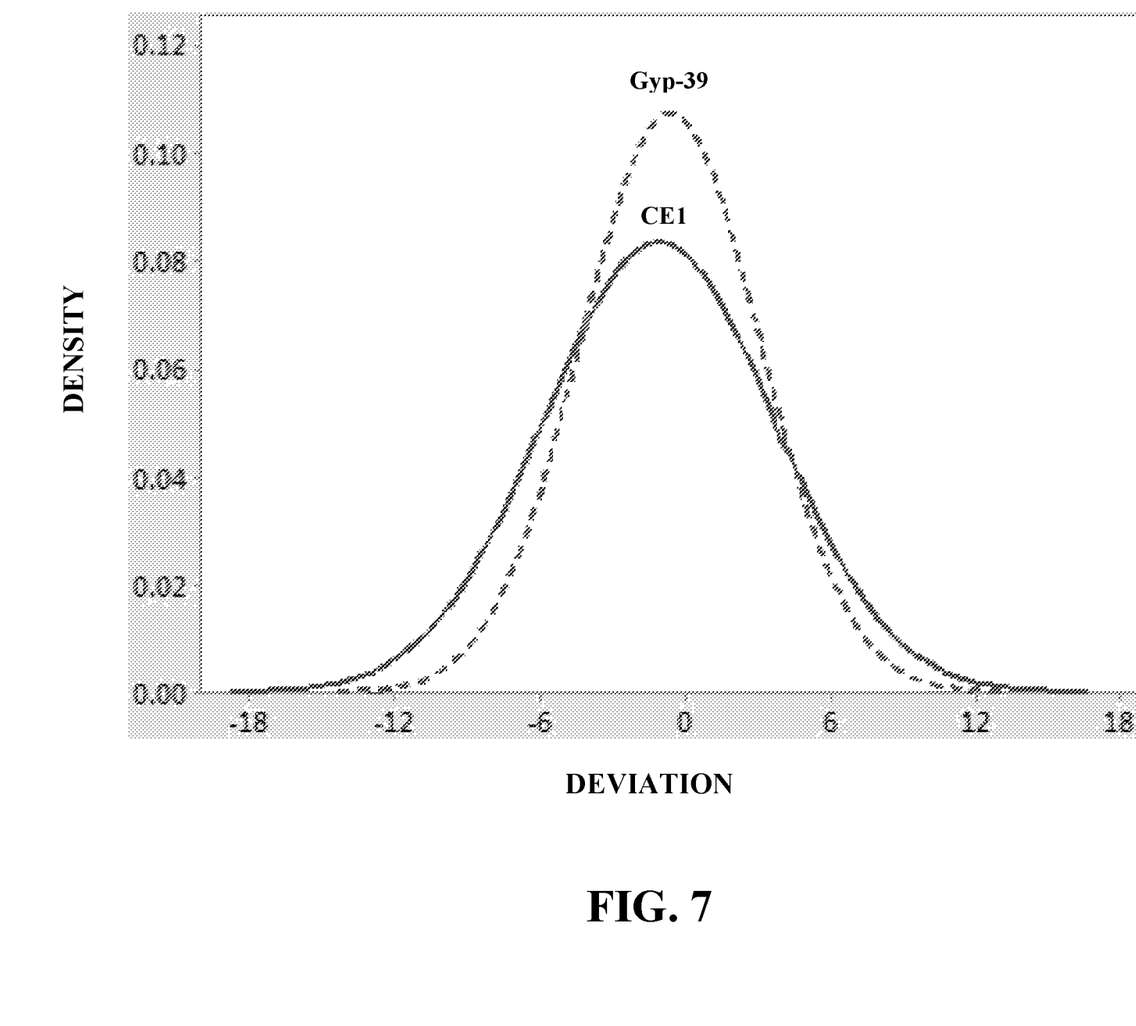
FIG. 7 is a graph showing the deviation from a target flow rate of 14 lbs/min when feeding WUCS glass fibers as described in Example 3.

The third feeding test was performed by separately feeding each of the WUCS glass fibers at a target rate of 14 lbs/min for about 17 minutes (250 lbs of fiber were loaded into the feeding hopper and fed at 14 lbs/min), and recording the motor magnitude (i.e., energy) required to maintain the target rate. As seen in FIG. 6, the energy required to feed the Gyp-39 WUCS glass fibers at 14 lbs/min was much lower than the energy required to feed the CE1 WUCS glass fibers at 14 lbs/min. The lower energy required during the feeding process demonstrates that the Gyp-39 WUCS glass fibers were easier to feed than the CE1 WUCS glass fibers. Furthermore, FIG. 7 shows that the Gyp-39 WUCS glass fibers had much less deviation during the feeding process than the CE1 WUCS glass fibers. The smaller deviation shows that the flow of Gyp-39 WUCS glass fibers through the feeding system was smoother and more consistent than the flow of the CE1 WUCS glass fibers.

Example 4

Figure 8A:
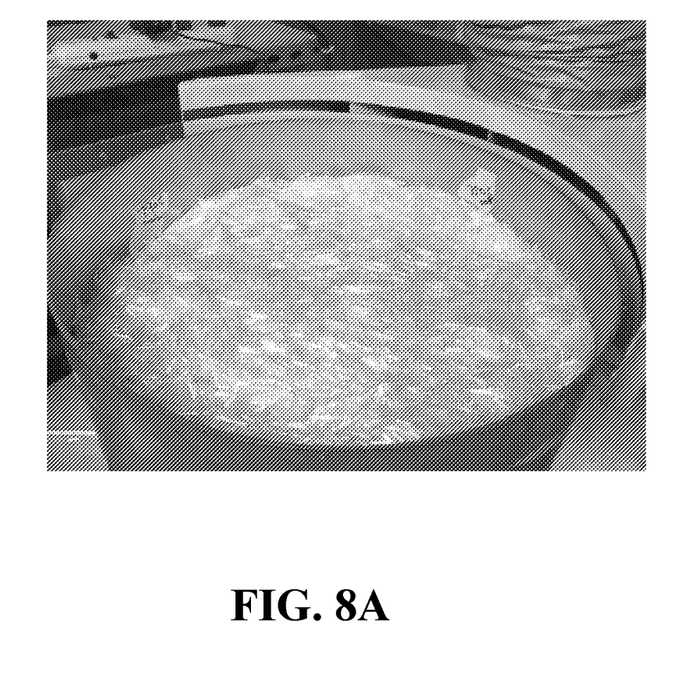
FIG. 8A is an image showing the packing density of WUCS glass fibers.
Figure 8B:
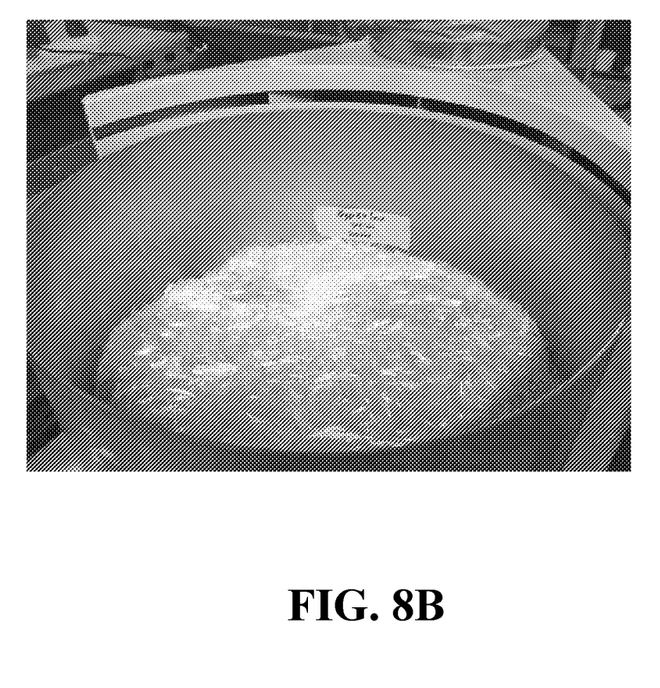
FIG. 8B is an image showing the packing density of the same weight of WUCS glass fibers as in FIG. 8A, but coated with an exemplary embodiment of the inventive sizing composition described herein.

In this example, the fiber packing density of the Gyp-39 WUCS glass fibers and the CE1 WUCS glass fibers from Example 3 were compared qualitatively. As seen in FIG. 8A, a feeding hopper was filled with 200 lbs of CE1 WUCS glass fibers. The same feeding hopper was also filled (in the same manner) with 200 lbs of Gyp-39 WUCS glass fibers, as shown in FIG. 8B. A comparison of FIG. 8A and FIG. 8B clearly shows that the Gyp-39 WUCS glass fibers pack much more densely than the CE1 WUCS glass fibers. The dense packing of the Gyp-39 WUCS glass fibers indicates that the Gyp-39 WUCS glass fibers have much better bundle integrity compared to the CE1 WUCS glass fibers, which results in better fiber flow and feeding.

Although several exemplary embodiments of sizing compositions, WUCS glass fibers, and gypsum board have been described herein, it should be appreciated that many modifications can be made without departing from the spirit and scope of the general inventive concepts described herein. All such modifications are intended to be included within the scope of the present description and the related general inventive concepts, which are to be limited only by the following claims.

What is claimed is:

1. A sizing composition comprising:
   water;
   a polyvinylpyrrolidone film former having a weight average molecular weight of 1,000,000 Da to 1,700,000 Da;
   a silane coupling agent;
   a lubricant comprising a condensation reaction product of a saturated fatty acid having at least 16 carbon atoms and a polyamine; and
   a surfactant;
   wherein the polyvinylpyrrolidone film former comprises from 30 wt. % to 50 wt. % of the dry solids of the sizing composition, and
   wherein a weight ratio based on dry solids of the polyvinylpyrrolidone film former to the lubricant is from 0.8:1 to 1.7:1.

2. The sizing composition according to claim 1, wherein the lubricant comprises from 30 wt. % to 50 wt. % of the dry solids of the sizing composition.

3. The sizing composition according to claim 1, wherein the saturated fatty acid is stearic acid and the polyamine is tetraethylenepentamine.

4. The sizing composition according to claim 1, wherein the silane coupling agent comprises from 2 wt. % to 10 wt. % of the dry solids of the sizing composition.

5. The sizing composition according to claim 1, wherein the silane coupling agent is selected from the group consisting of an amino silane, a methacryloxy silane, a silane ester, a vinyl silane, an epoxy silane, a sulfur silane, a ureido silane, an isocyanato silane, an azamido silane, and combinations thereof.

6. The sizing composition according to claim 1, wherein the silane coupling agent comprises γ-aminopropyltriethoxysilane.

7. The sizing composition according to claim 1, wherein the surfactant comprises from 5 wt. % to 15 wt. % of the dry solids of the sizing composition.

8. The sizing composition according to claim 1, wherein the surfactant comprises at least one of a polyethylene glycol fatty acid ester, a poloxamer, or a poloxamine.

9. The sizing composition according to claim 8, wherein the polyethylene glycol fatty acid ester is polyethylene glycol monooleate, and wherein the polyethylene glycol moiety has a molecular weight of 380 Da to 420 Da.

10. The sizing composition according to claim 1, wherein the sizing composition has a total solids content of 0.5 wt. % to 10 wt. %.

11. The sizing composition according to claim 1, wherein the lubricant comprises a condensation reaction product of stearic acid and tetraethylenepentamine.

12. Glass fibers for use in reinforcing gypsum board, the glass fibers comprising:
   a plurality of chopped glass fibers coated with a sizing composition, wherein the sizing composition comprises:
   water;
   a polyvinylpyrrolidone film former having a weight average molecular weight of 1,000,000 Da to 1,700,000 Da;
   a silane coupling agent;
   a lubricant comprising a condensation reaction product of a saturated fatty acid having at least 16 carbon atoms and a polyamine; and
   a surfactant;
   wherein the polyvinylpyrrolidone film former comprises from 30 wt. % to 50 wt. % of the dry solids of the sizing composition;
   wherein a weight ratio based on dry solids of the polyvinylpyrrolidone film former to the lubricant is from 0.8:1 to 1.7:1; and
   wherein the sizing composition is present on the chopped glass fibers in an amount of from 0.05% to 0.3% by weight based on the total weight of the sized chopped glass fibers.

13. The glass fibers according to claim 12, wherein the chopped glass fibers have a moisture content of 2 wt. % to 15 wt. %.

14. The glass fibers according to claim 12, wherein the lubricant comprises a condensation reaction product of stearic acid and tetraethylenepentamine.

15. The glass fibers according to claim 12, wherein the surfactant comprises at least one of a polyethylene glycol fatty acid ester, a poloxamer, or a poloxamine.

16. A gypsum board comprising:
   a gypsum layer having a first major surface and a second major surface, the gypsum layer comprising gypsum and a plurality of chopped glass fibers coated with a sizing composition distributed in the gypsum, wherein the sizing composition comprises:

water;
a polyvinylpyrrolidone film former having a weight average molecular weight of 1,000,000 Da to 1,700,000 Da;
a silane coupling agent;
a lubricant comprising a condensation reaction product of a saturated fatty acid having at least 16 carbon atoms and a polyamine; and
a surfactant;
wherein the polyvinylpyrrolidone film former comprises from 30 wt. % to 50 wt. % of the dry solids of the sizing composition;
wherein a weight ratio based on dry solids of the polyvinylpyrrolidone film former to the lubricant is from 0.8:1 to 1.7:1;
a first facing layer applied to the first major surface of the gypsum layer; and
a second facing layer applied to the second major surface of the gypsum layer.

17. The gypsum board according to claim 16, wherein the lubricant comprises from 30 wt. % to 50 wt. % of the dry solids of the sizing composition.

18. The gypsum board according to claim 16, wherein the lubricant comprises a condensation reaction product of stearic acid and tetraethylenepentamine.

19. The gypsum board according to claim 16, wherein the surfactant comprises at least one of a polyethylene glycol fatty acid ester, a poloxamer, or a poloxamine.

* * * * *